(12) United States Patent
Roberts (10) Patent No.: US 10,747,455 B2
(45) Date of Patent: Aug. 18, 2020

(54) PEER STORAGE SYSTEM WITH PEER OPERATION STATE INDICATOR

(71) Applicant: Western Digital Technologies, Inc., San Jose, CA (US)

(72) Inventor: Adam Roberts, Moncure, NC (US)

(73) Assignee: WESTERN DIGITAL TECHNOLOGIES, INC., San Jose, CA (US)

( * ) Notice: Subject to any disclaimer, the term of this patent is extended or adjusted under 35 U.S.C. 154(b) by 76 days.

(21) Appl. No.: 16/054,918

(22) Filed: Aug. 3, 2018

(65) Prior Publication Data

US 2020/0042215 A1 Feb. 6, 2020

(51) Int. Cl.
*G06F 3/06* (2006.01)
*H04L 29/08* (2006.01)

(52) U.S. Cl.
CPC .......... *G06F 3/0634* (2013.01); *G06F 3/0607* (2013.01); *G06F 3/067* (2013.01); *G06F 3/0614* (2013.01); *G06F 3/0689* (2013.01); *H04L 67/104* (2013.01)

(58) Field of Classification Search
CPC .... G06F 3/0634; G06F 3/0607; G06F 3/0614; G06F 3/067; G06F 3/0689; G06F 12/10; G06F 12/1081; G06F 12/08; G06F 12/0833; G06F 12/0831; H04L 67/104; H04L 67/18; H04L 29/08; H04L 67/1093; H04L 29/06
USPC ........................................................ 711/114
See application file for complete search history.

(56) References Cited

U.S. PATENT DOCUMENTS

| | | | |
|---|---|---|---|
| 8,356,050 B1* | 1/2013 | Olston | G06F 16/986 707/769 |
| 8,751,699 B1 | 6/2014 | Tsai et al. | |
| 2005/0015460 A1* | 1/2005 | Gole | H04L 29/06 709/213 |
| 2006/0059248 A1* | 3/2006 | Ikeda | H04L 67/104 709/219 |
| 2007/0038816 A1* | 2/2007 | Hughes | H04L 12/66 711/147 |
| 2007/0083725 A1* | 4/2007 | Kasiolas | G06F 3/0605 711/165 |
| 2007/0220160 A1* | 9/2007 | Seidel | H04L 67/104 709/230 |

(Continued)

*Primary Examiner* — Mano Padmanabhan
*Assistant Examiner* — Jean C Edouard
(74) *Attorney, Agent, or Firm* — Patent Law Works LLP (57) ABSTRACT

Example peer storage systems, storage devices, and methods provide peer operation state indicators for managing peer-to-peer operations. Peer storage devices establish peer communication channels that communicate data among the peer storage devices that bypasses the storage control plane for managing the peer storage devices. The peer storage devices identify peer operations that communicate data through the peer communication channels and generate a peer operation state during the operating period of the peer operations. The peer storage devices activate a state indicator configured to indicate the peer operation state. The state indicator may be used to prevent a storage controller or other entity with access to the storage device, including administrative personnel, from performing an operation that may corrupt data or truncate a media operation involving peer-to-peer communications.

20 Claims, 5 Drawing Sheets

(56) References Cited

U.S. PATENT DOCUMENTS

| | | | |
|---|---|---|---|
| 2012/0023214 A1* | 1/2012 | Leeds | H04L 41/0806 709/223 |
| 2013/0238711 A1* | 9/2013 | Lashkari | H04W 4/023 709/205 |
| 2013/0332696 A1* | 12/2013 | Schmidt | G06F 9/544 711/173 |
| 2014/0032857 A1* | 1/2014 | Rajagopalan | G06F 12/0831 711/144 |
| 2014/0032858 A1* | 1/2014 | Rajagopalan | G06F 12/0833 711/146 |
| 2016/0226973 A1* | 8/2016 | Appel | H04L 67/1078 |
| 2016/0255143 A1* | 9/2016 | Hunt | H04L 67/104 709/226 |

* cited by examiner

PEER STORAGE SYSTEM WITH PEER OPERATION STATE INDICATOR

TECHNICAL FIELD

The present disclosure generally relates to data storage systems, and in a more particular example, to data storage systems with peer-to-peer operations.

BACKGROUND

Multi-device storage systems utilize multiple discrete storage devices, generally disk drives (solid-state drives, hard disk drives, hybrid drives, tape drives, etc.) for storing large quantities of data. These multi-device storage systems are generally arranged in an array of drives interconnected by a common communication fabric and, in many cases, controlled by a storage controller, redundant array of independent disks (RAID) controller, or general controller, for coordinating storage and system activities across the array of drives. The data stored in the array may be stored according to a defined RAID level, a combination of RAID schemas, or other configurations for providing desired data redundancy, performance, and capacity utilization. In general, these data storage configurations may involve some combination of redundant copies (mirroring), data striping, and/or parity (calculation and storage), and may incorporate other data management, error correction, and data recovery processes, sometimes specific to the type of disk drives being used (e.g., solid-state drives versus hard disk drives).

Some multi-device storage systems employ storage devices capable of communicating with one another over the interconnecting fabric. In some cases, these storage devices may be capable of peer-to-peer communication without the involvement of a storage control plane, such as a storage controller or host controller, as an intermediary. These peer storage devices may be capable of exchanging messages and/or transferring host data across the interconnecting fabric independent of the storage control plane. Reducing communication, data transfer, processing, and/or data management at the storage control plane may reduce bottlenecks and improve scalability as the number and capacity of storage devices increases.

Enabling peer-to-peer communication and data operations that may be executed independent of the storage control plane may create challenges for management of data storage systems. For example, peer storage devices may operate across racks, administrative domains, and/or physical sites and may include operations that require substantial time to complete. It is possible these operations may support data protection, data rebuilds, or other business critical functions that are unknown to the administrator of a particular storage system or device and sudden interruption (such as the power cycling or physical removal of a peer storage device) may create unintended problems elsewhere.

Therefore, there still exists a need for storage architectures that enable peer-to-peer communication for data management offloading from the storage control plane that assists storage system administrators in managing peer operations.

SUMMARY

Various aspects for peer operations among peer storage devices, particularly, activating peer operation state indicators are described. In an innovative aspect, a storage device comprises a processor, a memory, and an interface configured to communicate with a plurality of peer storage devices. A peer state manager is stored in the memory and executable by the processor to perform operations comprising identifying a peer operation that communicates data through the interface to at least one of the plurality of peer storage devices, generating a peer operation state during an operating period of the peer operation, and activating a state indicator configured to indicate the peer operation state generated by the peer state manager. The data communicated by the peer operation bypasses a storage control plane.

In various embodiments, the operations may further comprise identifying a peer storage device identifier for the peer operation and generating peer operation state data including the peer storage device identifier. The operations may further comprise identifying a peer storage device location corresponding to the peer storage device identifier and including the peer storage device location in the peer operation state data. The operations may further comprise identifying a peer operation type corresponding to the peer operation and including the peer operation type in the peer operation state data. The peer operation type may be selected from a plurality of peer operation types. The operations may further comprise identifying a peer operation status corresponding to the peer operation and including the peer operation status in the peer operation state data. The peer operation status may include at least an operation priority. The peer operation status may include at least one operation duration estimate value.

In some embodiments, the state indicator may include a graphical user interface configured to display the peer operation state data. The storage device may include a storage device housing. The state indicator may include at least one visual indicator on an exterior of the storage device housing. The at least one visual indicator may be distinguishable from a device power indicator and a device processing indicator.

In some embodiments, the state indicator may be in communication with the storage control plane and the storage control plane provides at least one automated response to a peer operation state change received from the state indicator. The peer operation state change may be from a first peer operation state value to a second peer operation state value.

In another innovative aspect, a computer-implemented method for execution by a storage device provides a peer operation state indicator. Storage device identifiers for a plurality of peer storage devices are stored in a first storage device. A peer communication channel is established with at least one of the plurality of peer storage devices from the first storage device. Data communicated through the peer communication channel bypasses a storage control plane for managing the first storage device. A peer operation is executed that communicates data through the peer communication channel. A peer operation state is generated during an operating period of the peer operation. A state indicator is activated in response to the peer operation state during the operating period.

In various embodiments, a peer storage device identifier may be identified for the peer operation, peer operation state data may be generated, and the peer operation state data may be sent with the state indicator. A peer storage device location corresponding to the peer storage device identifier may be identified and included in the peer operation state data. A peer operation type corresponding to the peer operation may be identified and included in the peer operation state data. The peer operation type may be selected from a plurality of peer operation types. A peer operation status corresponding to the peer operation may be identified and included in the peer operation state data. The peer operation status may include at least an operation priority. The peer operation status may include at least one operation duration estimate value.

In some embodiments, the state indicator and at least one peer operation state value from the peer operation state data may be displayed through a graphical user interface. A storage device housing may be provided for the first storage device. The state indicator may include at least one visual indicator on an exterior of the storage device housing. The at least one visual indicator may be distinguishable from a device power indicator and a device processing indicator. The state indicator may be received at the storage control plane. At least one automated response to a peer operation state change received may be executed in response to the state indicator. The peer operation state change may be from a first peer operation state value to a second peer operation state value.

In yet another innovative aspect, a storage system comprises a plurality of peer storage devices and each storage device comprises various means. Means are provided for storing storage device identifiers for a plurality of peer storage devices. Means are provided for establishing a peer communication channel between at least two of the plurality of peer storage devices. Data communicated through the peer communication channel bypasses a storage control plane for managing the plurality of peer storage devices. Means are provided for executing a peer operation that communicates data through the peer communication channel. Means are provided for generating a peer operation state during an operating period of the peer operation. Means are provided for activating a state indicator in response to the peer operation state during the operating period.

In various embodiments, means may be provided for generating peer operation state data corresponding to the peer operation state. Means may be provided for displaying the state indicator and at least one peer operation state value from the peer operation state data.

The various embodiments advantageously apply the teachings of multi-device peer storage systems to improve the functionality of such computer systems. The various embodiments include operations to overcome or at least reduce the issues in the previous storage systems discussed above and, accordingly, are more reliable and scalable than other computer data storage architectures for some applications. That is, the various embodiments disclosed herein include hardware and/or software with functionality to improve the reliability and scalability of peer-to-peer data management operations, based on reducing administrative errors while managing peer storage devices. Accordingly, the embodiments disclosed herein provide various improvements to storage systems.

It should be understood that language used in the present disclosure has been principally selected for readability and instructional purposes, and not to limit the scope of the subject matter disclosed herein.

DETAILED DESCRIPTION

Figure 1:
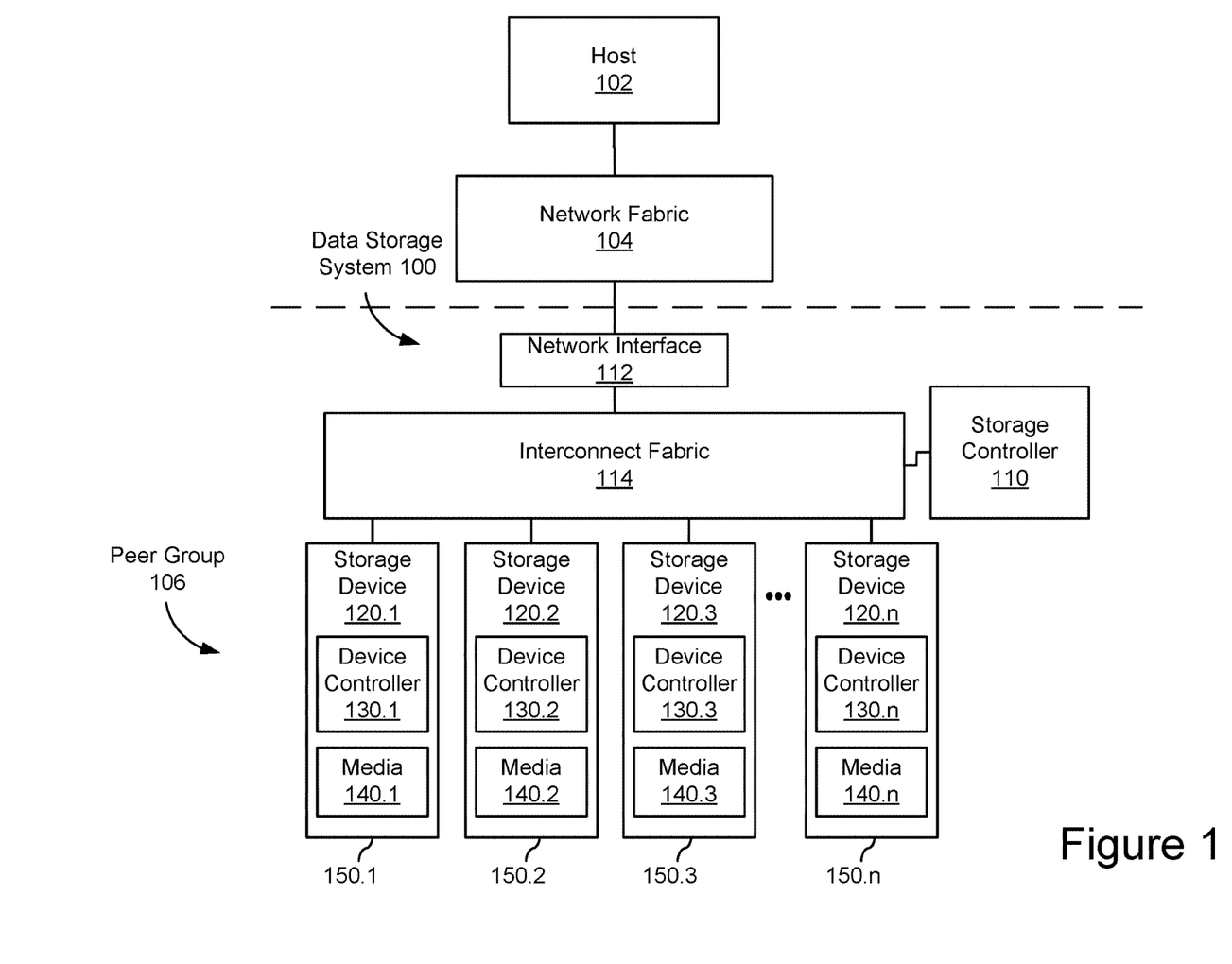
FIG. 1 schematically illustrates an example of a peer storage system.

FIG. 1 shows an embodiment of an example data storage system 100 with peer communicating data storage devices 120. While some example features are illustrated, various other features have not been illustrated for the sake of brevity and so as not to obscure pertinent aspects of the example embodiments disclosed herein. To that end, as a non-limiting example, data storage system 100 includes one or more data storage devices 120 (also sometimes called information storage devices, storage devices, or disk drives) configured in a peer group 106.

In the embodiment shown, peer group 106 includes a number of storage devices 120 attached to a common interconnect fabric 114. For example, peer group 106 may include a number of disk drives arranged in a storage array, such as storage devices sharing a common rack or unit in a data center. In some embodiments, peer group 106 may share back plane connectivity, network switch(es), and/or other hardware and software components related to interconnect fabric 114. In some embodiments, peer groups may not be collocated in the same unit, rack, data center, or geography. For example, interconnect fabric 114, network interface 112, and network fabric 104 may enable peer-to-peer communication among storage devices over any distance and peer bonds may be established regardless (or even because of) different geographic locations, data centers, administrators, and organizations. In some embodiments, peer group 106 may be defined by peer bonds that enable peer-to-peer communication without the intervention of related storage control planes.

In some embodiments, the data storage devices 120 are, or include, solid-state drives (SSDs). Each data storage device 120.1-120.$n$ may include a non-volatile memory (NVM) or device controller 130 based on compute resources (processor and memory) and a plurality of NVM or media devices 140 for data storage (e.g., one or more NVM device(s), such as one or more flash memory devices). In some embodiments, a respective data storage device 120 of the one or more data storage devices includes one or more NVM controllers, such as flash controllers or channel controllers (e.g., for storage devices having NVM devices in multiple memory channels).

In some embodiments, a respective data storage device 120 may include a single media device 140 while in other embodiments the respective data storage device 120 includes a plurality of media devices. In some embodiments, media devices include NAND-type flash memory or NOR-type flash memory. In some embodiments, data storage device 120 includes one or more hard disk drives (HDDs). In some embodiments, data storage devices 120 may include a flash memory device, which in turn includes one or more flash memory die, one or more flash memory packages, one or more flash memory channels or the like. However, in some embodiments, one or more of the data storage devices 120 may have other types of non-volatile data storage media (e.g., phase-change random access memory (PCRAM), resistive random access memory (ReRAM), spin-transfer torque random access memory (STT-RAM), magneto-resistive random access memory (MRAM), etc.).

Storage controller 110 is coupled to data storage devices 120.1-120.$n$ through interconnect fabric 114. However, in some embodiments, storage controller 110 may be hosted as a component and/or a subsystem of another component of data storage system 100. For example, in some embodiments, some or all of the functionality of storage controller 110 may be implemented by software executed on one or more compute resources in at least one of data storage devices 120.1-120.*n*, interconnect fabric 114, or interface 112. Storage controller 110 is sometimes called a controller system, a main controller system, a non-volatile memory express (NVMe) controller, garbage collection (GC) leader, or storage virtualization controller (SVC). In some embodiments, a device controller 130.1 associated with a particular storage device (e.g., 120.1) acts as storage controller 110 for other storage devices (e.g., 120-2, 120-3, and 120.*n*) in data storage system 100. In some embodiments, storage controller 110 is a component and/or subsystem of host 102 (described below).

In some embodiments, host 102 is coupled to data storage system 100 through network interface 112 over a network fabric 104. In some embodiments, multiple hosts 102 (only one of which is shown in FIG. 1) are coupled to data storage system 100 through network interface 112, which may be a storage network interface or other interface capable of supporting communications with multiple hosts 102. Network fabric 104 may include a wired and/or wireless network (e.g., public and/or private computer networks in any number and/or configuration) which may be coupled in a suitable way for transferring data. For example, network fabric 104 may include any means of a conventional data communication network such as a local area network (LAN), a wide area network (WAN), a telephone network, such as the public switched telephone network (PSTN), an intranet, the internet, or any other suitable communication network or combination of communication networks.

Host 102, or a respective host in a system having multiple hosts, may be any suitable computer device, such as a computer, a laptop computer, a tablet device, a netbook, an internet kiosk, a personal digital assistant, a mobile phone, a smart phone, a gaming device, a computer server, or any other computing device. Host 102 is sometimes called a host system, client, or client system. In some embodiments, host 102 is a server system, such as a server system in a data center. In some embodiments, the one or more hosts 102 are one or more host devices distinct from storage controller 110 and distinct from the plurality of storage devices 120; but in some other embodiments, the one or more hosts 102 include one of the storage devices 120 that has been configured to perform data processing operations and to send data storage commands to access data stored in the one or more storage devices 120. In some other embodiments, the one or more hosts 102 are configured to store and access data in the plurality of storage devices 120.

In some embodiments, data storage system 100 includes one or more processors, one or more types of memory, a display and/or other user interface components such as a keyboard, a touch screen display, a mouse, a track-pad, and/or any number of supplemental devices to add functionality. In some embodiments, data storage system 100 does not have a display and other user interface components.

The one or more device controllers 130, if included in a respective storage device 120, are coupled with storage controller 110 through interconnect fabric 114. Interconnect fabric 114 is sometimes called a data connection, but typically convey commands in addition to data, and optionally convey metadata, error correction information and/or other information in addition to data values to be stored in media devices 140 and data values read from media devices 140.

In some embodiments, however, storage controller 110, the one or more device controllers 130, and media devices 140 are included in the same device (i.e., an integrated device) as components thereof. Furthermore, in some embodiments, one or more of the storage devices 120 (e.g., including storage controller 110, the one or more device controllers 130, and media devices 140) are embedded in a host device (e.g., host 102), such as a mobile device, tablet, other computer or computer-controlled device, and the methods described herein are performed, at least in part, by the embedded storage controller. In some embodiments, device controllers 130 are configured to both control one or more media devices 140 and provide distributed storage controller functions in conjunction with storage controller 110.

In some embodiments, storage devices 120 include a plurality of media devices 140, such as flash memory devices, and optionally includes fewer device controllers 130. Viewed another way, in some embodiments, a storage device 120 includes multiple memory channels, each of which has a device controller 130 and a set of media devices 140 coupled to the device controller 130. However, in some embodiments, two or more memory channels share a device controller 130. In either example, each memory channel has its own distinct set of media devices 140. In a non-limiting example, the number of memory channels in a typical storage device is 8, 16, or 32. In another non-limiting example, the number of media devices 140 per memory channel is typically 8, 16, 32, or 64. Furthermore, in some embodiments, the number of media devices 140 in one memory channel is different from the number of media devices in another one of the memory channels.

In some embodiments, each device controller of device controllers 130 includes one or more processing units (also sometimes called CPUs or processors or microprocessors or microcontrollers) configured to execute instructions in one or more programs (e.g., in device controllers 130). In some embodiments, the one or more processors are shared by one or more components within, and in some cases, beyond the function of device controllers 130. As noted above, media devices 140 are coupled to device controllers 130 through connections that typically convey commands in addition to data, and optionally convey metadata, error correction information and/or other information in addition to data values to be stored in media devices 140 and data values read from media devices 140. Media devices 140 may include any number (i.e., one or more) of memory devices including, without limitation, non-volatile semiconductor memory devices, such as flash memory device(s).

Flash memory device(s) (e.g., media devices 140) can be configured for enterprise storage suitable for applications such as cloud computing, for database applications, primary and/or secondary storage, or for caching data stored (or to be stored) in secondary storage, such as hard disk drives. Additionally, and/or alternatively, flash memory device(s) (e.g., media devices 140) can also be configured for relatively smaller-scale applications such as personal flash drives or hard-disk replacements for personal, laptop, and tablet computers. Although flash memory devices and flash controllers are used as an example here, in some embodiments storage device(s) 120 include other non-volatile memory device(s) and corresponding non-volatile storage controller(s).

In some embodiments, media devices 140 are divided into a number of addressable and individually selectable blocks, sometimes called erase blocks. In some embodiments, individually selectable blocks are the minimum size erasable units in a flash memory device. In other words, each block contains the minimum number of memory cells that can be erased simultaneously (i.e., in a single erase operation). Each block is usually further divided into a plurality of pages and/or word lines, where each page or word line is typically an instance of the smallest individually accessible (readable) portion in a block. In some embodiments (e.g., using some types of flash memory), the smallest individually accessible unit of a data set, however, is a sector or codeword, which is a subunit of a page. That is, a block includes a plurality of pages, each page contains a plurality of sectors or codewords, and each sector or codeword is the minimum unit of data for reading data from the flash memory device.

Figure 2:
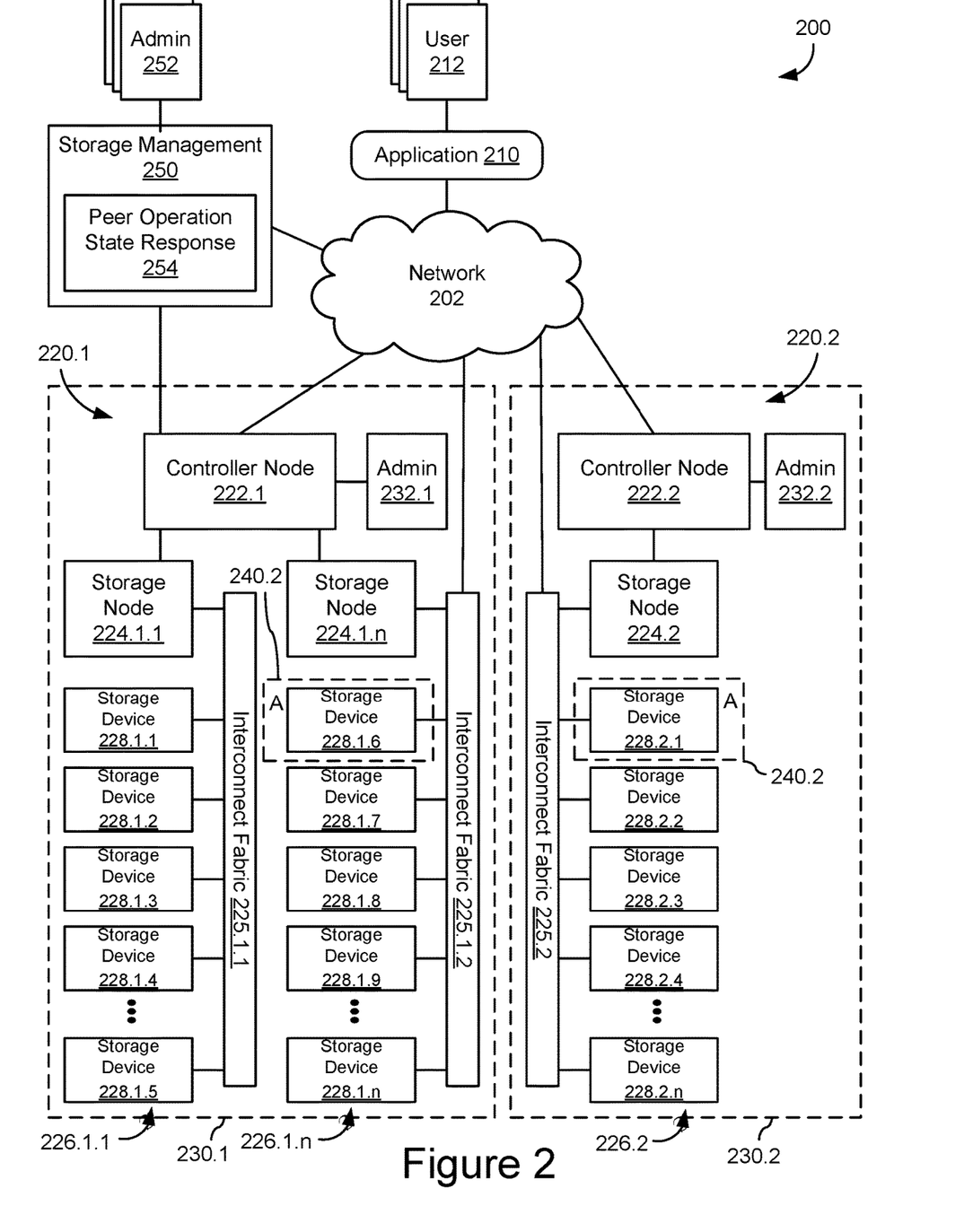
FIG. 2 schematically illustrates an example administrative configuration for one or more peer storage systems.

FIG. 2 shows an embodiment of an example storage system 200, such as a global storage system implementing multiple distributed storage systems 230 in different locations 220. Storage system 200 may be implemented as a plurality of distributed storage systems 230 which is coupled to an application 210 for accessing, storing, and using data stored in storage system 200. Storage system 200 may include a plurality of storage devices 228 configured as components of the disaggregated storage systems and some or all of these storage devices 228 may be configured for peer communication and allocated in one or more peer groups. In some embodiments, these peer groups may include storage devices at different physical locations 220 with different administrators 232. Additional remote administrators 252 may have various responsibilities for storage system 200 and use a network-based storage management system 250 to configure, monitor, and maintain storage system 200.

The connection between storage system 200 and application 210 could, for example, be implemented as a suitable data communication network 202, such as a LAN, WAN, internet, etc. Application 210 could, for example, be a dedicated software application running on a computing device, such as a personal computer, a laptop, a wireless telephone, a personal digital assistant or any other type of communication device that is able to interface with the storage system 200. In some embodiments, application 210 could, for example, comprise a suitable file system which enables a general purpose software application to interface with storage system 200, an application programming interface (API) library for the storage system 200, etc. In some embodiments, application 210 may be a user application, such as business or personal application instantiated in a local, client/server, web, and/or mobile application that enables users 212 to interact with data stored in storage system 200.

As further shown in FIG. 2, storage system 200 comprises two storage locations 220 implementing disaggregated storage architectures. Each storage location 220 may include a controller node 222 and one or more storage nodes 224 which may be coupled in a suitable way for transferring data, for example by means of interconnect fabrics 225. Each of storage nodes 224 may further connect to a plurality of storage devices 228 arranged in storage arrays 226. Controller nodes 222, storage nodes 224, and storage devices 228 may connect to the data communication network 204 and each other by means of suitable wired, wireless, optical, etc. network connections or any suitable combination of such network connections.

In the embodiment shown, storage device 228.1.6 and storage device 228.2.1 are both in peer group A 240 and may participate in a peer bond when a peer operation is operating between them. For example, storage device 228.1.6 and storage device 228.2.1 may be configured in the same peer group A to enable peer-to-peer communication between their respective locations 220.

Although the example of Figures shows only two controller nodes 222, three storage nodes 224, three storage arrays 226, and fifteen storage devices 228, storage system 200 could comprise any other suitable number of controller nodes 222, storage nodes 224, and storage devices 228 arranged in any number of storage arrays 226. Similarly, any number of storage devices 228 may be configured for peer group A or for other peer groups. In some embodiments, storage devices may participate in multiple peer groups at the same time.

Controller nodes 222 and storage nodes 224 can be built as general-purpose computers, however more frequently they are physically adapted for arrangement in large data centers, where they are arranged in modular racks comprising standard dimensions. Exemplary controller nodes 222 and storage nodes 224 may be dimensioned to take up a single unit of such rack, which is generally referred to as 1U. Such an exemplary storage node 224 may use a low-power processor and may be equipped with ten or twelve high capacity serial advanced technology attachment (SATA) storage devices 228 (even though only five storage devices 228 are shown for each storage node 224) and is connectable to the network over redundant Ethernet network interfaces. In some embodiments, storage nodes 224 may include a compute complex providing storage controller or other storage-related functionality.

An exemplary controller node 222 may comprise high-performance servers and provide network access to applications 210 over multiple high bandwidth Ethernet network interfaces. Data can be transferred between applications 210 and such a controller node 222 by means of a variety of network protocols including hypertext transfer protocol (HTTP)/representational state transfer (REST) object interfaces, language-specific interfaces such as Microsoft .Net, Python or C, etc. Additionally, such controller nodes may comprise additional high bandwidth Ethernet ports to interface with the storage nodes 224. In some embodiments, HTTP/REST protocols complying with S3 may enable data transfer through a REST application protocol interfaces (API). Preferably, such controller nodes 222 operate as a highly available cluster of host nodes, and provide for example shared access to the storage nodes 224, metadata caching, protection of metadata, etc.

Several storage nodes 224 can be grouped together, for example because they are housed in a single rack or a single physical location 220.1. For example, storage nodes 224.1.1 to 224.1.n may be grouped in physical location 220.1 and support host node 202.1, while storage node 224.2 may be located in physical location 220.2 and support host node 202.2. These physical locations 220 are not required to be located at the same geographic location, they are often geographically dispersed across different data centers. For example, physical location 220.1 can be located at a data center in Europe and physical location 220.2 at a data center in China. Peer group A may communicate between physical locations 220 and may engage in peer-to-peer data operations, such as data offloading or rebuild from RAID or mirrored data, across physical locations 220 through network 202. In some embodiments, administrator 232.1 in location 220.1 and administrator 232.2 in location 220.2 may not control when peer data operations occur between storage device 228.1.6 and storage device 228.2.1.

Controller nodes 222, storage nodes 224, and/or host systems for application 210 and/or storage management system 250, may provide a storage control plane for storage devices 228. In some embodiments, the storage control plane may include any system components that provide host read/write, RAID management, and/or storage array or storage system level data management commands that are not themselves peer storage devices. For example, the storage control plane may include a combination of storage controllers, host controllers, RAID controllers, and similar systems. The storage control plane may be distinguishable (in terms of function) from interconnect and network fabric systems that are responsible for providing physical and data layer communication between system components, which may include addressing and routing of data frames. In some embodiments, the same hardware may participate in the storage control plane and the interconnect and/or network fabric, but the storage control plane functions relate to originating and/or translating media storage related commands (session, presentation, and/or application layer activities) and are distinguishable from networking functions (physical, data link, and network layer activities). In some embodiments, peer storage devices may provide storage control commands to one another, but they are not part of the storage control plane.

In some embodiments, storage management system 250 may be configured as an application or module in an information technology (IT) management system running on a general-purpose computer, such as such as a personal computer, a laptop, a tablet, a wireless telephone, a personal digital assistant or any other type of communication device that is able to interface with the storage system 200 and/or operational data about storage system 200 over network 202. For example, storage management system 250 may provide a dashboard for system maps, configuration information, operating data, system/component diagnostics, performance metrics, and/or status information for storage devices 228, storage arrays 226, storage nodes 224, controller nodes 222, etc. In some embodiments, storage management system 250 may include RAID configurations, rebuild status, backup/archive configurations, storage device endurance and lifecycle management, and peer group configurations. Storage management system 250 may support a number of administrators 252 with varying IT management responsibilities, including provisioning, maintenance, data management, equipment management, and related scheduling, costing, and project management.

In some embodiments, storage management system 250 may include a peer operation state response module 254. For example, when storage device 228.1.6 or storage device 228.2.1 initiate a peer operation with the other and enter a peer bonded state, one or both of them may activate a peer operation state indicator that is received by storage management system 250. Peer operation state response module 254 may include logic for automatically responding to the peer operation state indicator when it indicates a change from a first peer operation state to a second peer operation state.

For example, a peer operation-initiated state may occur when a peer device sends an initial peer operation request to a peer storage device. The receiving peer storage device may evaluate the available compute resources or requested host data to determine whether it is available to participate in the requested peer operation. If the peer storage device is available, it may begin processing the peer operation. A peer operation-active state may occur during the operating period of the peer operations. For example, the peer operation may include a series of media reads/writes on one or both storage devices, buffer-to-buffer transfers between storage devices, command messages and responses between storage devices, data processing, and/or queries to metadata, device/system configuration or status information, etc. In some cases, a peer operation, such as participation in data mirroring, RAID rebuild, data offloading, garbage collection, data scrub, or RAID support (mirror or parity) for an extended write, may require an extended operating period of seconds, minutes, hours, or even days, depending on the scope of the task.

In some embodiments, additional peer operation states may include peer operation-suspended (if operation interrupts are enabled), peer operation-cancelled, peer operation-completed, peer operation-waiting (where peer devices maintain a ready status when compute resources are available). In some embodiments, peer operation state response module 254 may provide logic for responding to each peer operation state change. For example, peer operation state response module 254 may classify some operational states as interruptible and some as non-interruptible and provide appropriate alerts to administrators 252 and/or administrators 232. In some embodiments, peer operation state response module 254 may include additional automated actions, such as visual indicators, physical locks to prevent removal of storage devices, and/or systems that prevent power cycling or other interventions that may interrupt the peer operation.

In some embodiments, storage management system 250 may include a graphical user interface and may be configured to display information regarding the peer operation state of storage devices 228 based on receiving peer operation state indicators from one or more storage devices 228. In some embodiments, peer operation state indicators may be associated with peer operation state data providing more information regarding the peer operation state. Storage management system 250 may be configured to display values from the peer operation state data directly or through one or more display configurations and/or visualization tools.

Figure 3:
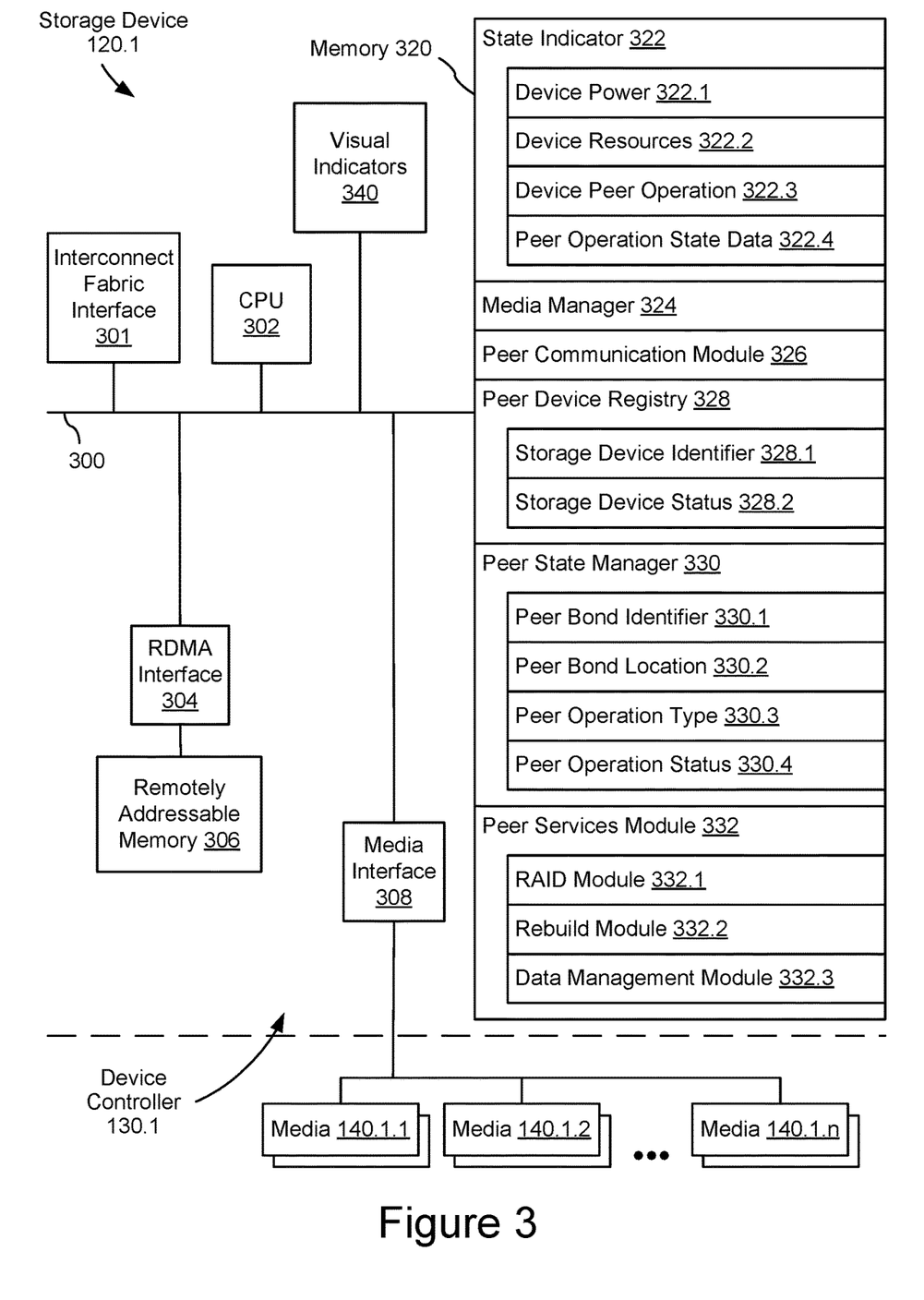
FIG. 3 schematically illustrates an example of a storage device of the peer storage system of FIG. 1.

In some embodiments, as shown in FIG. 3, a storage device 120.1 includes the functions of a device controller 130.1 with peer communication capabilities using compute resources, such as one or more processing units (CPUs 302), sometimes herein called CPU, processors, or hardware processors, and sometimes implemented using microprocessors, microcontrollers, or the like, configured to execute instructions in one or more programs (e.g., the modules in memory 320). In some embodiments, the one or more CPUs 302 are shared by one or more components within, and in some cases, beyond the function of storage device 120. The modules in memory 320 and executed by CPU 302 may be coupled to interconnect fabric interface 301, RDMA interface 304, media interface 308, and any number of additional modules, such as erasure coding engines, error correction engines, specialized memory modules, etc., in order to coordinate the operation of these components. In some embodiments, the components of storage device 120.1 may be interconnected by one or more communication buses 300. In some embodiments, CPU 302, memory 320, media interface 308, and any number of additional modules may be packaged as a device controller 130.1, such as an NVM controller, implemented in an application-specific integrated circuit (ASIC), system on a chip (SoC), field programmable gate array (FPGA), or similar architecture.

In some embodiments, storage device 120.1 may be packaged in a housing (not shown), such as a sealed, multipart disk drive housing. For example, device controller 130.1 and media devices 140.1 may be enclosed in the housing. In some embodiments, the housing may have an exterior surface surrounding the internal components, with one or more connectors projecting from or interface ports recessed into the exterior surface. For example, these connectors and/or interface ports may provide physical interconnects for power to and communication with storage device 120.1.

In some embodiments, storage device 120.1 may include one or more visual indicators 340 disposed on an exterior surface of the housing. For example, storage device 120.1 may include a series of light emitting diode (LED) lights visible from the exterior of the housing to provide visual indicators regarding the state of storage device 120.1. LED light configurations may enable the use of different lights, different colors, blinking, and combinations thereof to indicate different state information. As another example, storage device 120.1 may include a graphical display, such as an LED, liquid crystal display (LCD), vacuum fluorescent display (VFD), etc. to display characters and/or graphics for visual indicators 340. In some embodiments, visual indicator 340 may include a port for connecting to an external visual indicator or visual display. In some embodiments, storage device 120.1 may include one or more auditory, tactile, or other sensory display to supplement or replace visual indicators 340. In some embodiments, visual indicators 340 may be connected to communication buses 300 and peer operation state may be displayed through visual indicators 340.

Storage device 120.1 may include a variety of local memory resources and local compute resources. In some embodiments, local resources may include components that are integrated into storage device 120.1 and may scale with the number of storage devices. Example local memory resources may include memory 320 (e.g. the operating memory of media controller 130.1), remotely addressable memory 306 (e.g. remotely addressable memory available through a remotely addressable interface), and other specialized memory (not shown). In some embodiments, storage media, such as media devices 140, may provide local memory resources for data management functions, but these may be distinct from storage locations for host data. Example local compute resources may include CPU 302 (e.g. the operating processor of device controller 130.1), erasure coding engines, error correction engines, and any other specialized processing systems. In some embodiments, one or more interfaces, such as interconnect fabric interface 301 or RDMA interface 304, may also include or utilize memory and/or compute resources and may be part of the available local resources of storage device 120.1.

In some embodiments, RDMA interface 304 may be a hardware, software, or combined hardware/software engine for providing remote data management access to remotely addressable memory 306. This may include local direct memory access (DMA) to remotely addressable memory 306 for CPU 302 or other components of device controller 130.1. The RDMA engines of RDMA interface 304 may allow storage device 120.1 to push or pull data from/to remotely addressable memory 306 and to/from memory locations in other storage devices, storage controllers (e.g. storage controller 110), or servers (e.g. host 102).

Additional modules (not shown) supporting one or more functions of storage device 120 may be connected to CPU 302, RDMA interface 304, media interface 308, and memory 320. In some embodiments, additional module(s) are executed in software by the CPU 302; in other embodiments, additional module(s) are implemented in whole or in part using special purpose circuitry (e.g., to perform encoding and decoding functions).

In some embodiments, during a write operation initiated by a host 102, storage controller 110 receives a host write command (e.g., in a set of one or more host write commands) via interface 112 (FIG. 1), translates that host write command into a write command, sometimes called a translated command or translated write command, suitable for execution by a data storage device 120, and sends the translated host data command to one or more data storage devices corresponding to one more addresses specified by the host write command, a destination storage device.

In some storage systems, a storage controller also receives, via interface 112, data to be stored in the one or more data storage devices corresponding to the one more addresses specified by the host write command. A respective data storage device receives the data to be stored in its media devices 140.1.1-140.1.n, or a portion of the data to be stored, from the storage controller via the interconnect fabric 114. The data received by the storage device may be encoded or otherwise processed and made available to storage media interface 308, which transfers the data to media devices 140.1 in a manner dependent on the type of storage medium being utilized. In storage device 120, RDMA interface 304 and remotely addressable memory 306, sometimes in conjunction with coordination from storage controller 110, may allow host 102 to send the data to be stored in the host write command to remotely addressable memory 306 in storage device 120 without them passing through storage controller 110 or another storage controller.

In some embodiments, a storage media (e.g., media devices 140.1) is divided into a number of addressable and individually selectable blocks and each block is optionally (but typically) further divided into a plurality of pages and/or word lines and/or sectors, storage locations of defined storage unit sizes. While erasure of data from a storage medium is performed on a block basis, in many embodiments, reading and programming of the storage medium is performed on a smaller subunit of a block (e.g., on a page basis, word line basis, or sector basis).

In some embodiments, the smaller subunit of a block consists of multiple memory cells (e.g., single-level cells or multi-level cells). In some embodiments, programming is performed on an entire page. In some embodiments, a multi-level cell (MLC) NAND flash typically has four possible states per cell, yielding two bits of information per cell. Further, in some embodiments, a MLC NAND has two page types:

(1) a lower page (sometimes called the fast page), and (2) an upper page (sometimes called the slow page). In some embodiments, a triple-level cell (TLC) NAND flash has eight possible states per cell, yielding three bits of information per cell. Although the description herein uses TLC, MLC, and SLC as examples, those skilled in the art will appreciate that the embodiments described herein may be extended to memory cells that have more than eight possible states per cell, yielding more than three bits of information per cell. In some embodiments, the encoding format of the storage media (i.e., TLC, MLC, or SLC and/or a chosen data redundancy mechanism or ECC code) is a choice made when data is actually written to the storage media.

In addition, these various memory cell configurations and encoding formats may impact the lifetime performance of storage device 120.1. Flash memory may have defined I/O performance, endurance, write voltage thresholds, error rates, cell/device failures, and other parameters that may be tracked for specific performance values and/or contributions to storage capacity, performance class, endurance, and/or overall health. Similarly, cell usage, read and write load balancing, garbage collection, and other operations may be tracked for endurance, reliability, and failure prediction for media devices 140.

FIG. 3 is a block diagram illustrating peer communications and peer operation status information handled by storage device 120.1 and its peer storage devices 120, in accordance with some embodiments. Storage device 120.1 includes CPU 302 for executing modules, programs, and/or instructions stored in memory 320 and thereby performing processing operations, memory 320 (sometimes called NVM controller memory, device controller memory, or operating memory), and one or more communication buses 300 for interconnecting these components.

The one or more communication buses 300 optionally include circuitry (sometimes called a chipset) that interconnects and controls communications between system components. CPU 302 and memory 320 may be coupled to interconnect fabric interface 301, RDMA interface 304, remotely addressable memory 306, media interface 308, visual indicators 340, media devices 140.1, and any additional module(s) by the one or more communication buses 300. In some embodiments, interface hardware and/or protocols for providing communication through communication buses 300 may also be present for communication with any given component.

Memory 320 may include high-speed random access memory, such as DRAM, SRAM, DDR RAM, or other random access solid state memory devices, and may include non-volatile memory, such as one or more magnetic disk storage devices, optical disk storage devices, flash memory devices, or other non-volatile solid state storage devices. Memory 320 may optionally include one or more storage devices remotely located from CPU 302. In some embodiments, one or more additional memories may be provided for specific functions, such as an FTL memory for flash translation layer (FTL) data, and/or remotely addressable memory 306. These functional memories may include specialized processing, hardware acceleration, and/or other resources related to their function. In some embodiments, remotely addressable memory 306 may be part of memory 320.

Memory 320, or alternatively the non-volatile memory device(s) within memory 320, comprises a non-transitory computer readable storage medium. In some embodiments, memory 320, or the non-transitory computer readable storage medium of memory 320 stores the following programs, modules, and data structures, or a subset or superset thereof:
state indicator 322 for maintaining and indicating various states of storage device 120.1 that may relate to device power indicators, device processing indicators, and other operations, including peer operations;
media manager 324 for managing storage device FTL data (including logical address mapping) and related processes and requests, such as media read and write operations through media interface 308 to media devices 140.1.1-140.1.n;
peer communication module 326 for communicating command messages and data transfers between storage devices 120 through interconnect fabric interface 301, sometimes using access to remotely addressable memory 306, without the intervention of host 102, storage controller 110, or similarly distinct storage control plane systems;
peer device registry 328 for identifying the peer storage device identifiers of peer storage devices and/or storing other data management and/or peer services information related to each other storage device;
peer state manager 330 for identifying, managing, and maintaining peer operation states and related peer operation state data to activate state indicator 322 as it relates to peer operations; and
peer services module 332 for executing example peer services that may include one or more peer operations involving peer bonds with other storage devices.

Each of the above identified elements may be stored in one or more of the previously mentioned memory devices that together form memory 320 and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 320 may store a subset of the modules and data structures identified above. Furthermore, memory 320 may store additional modules and data structures not described above. In some embodiments, the programs, modules, and data structures stored in memory 320, or the non-transitory computer readable storage medium of memory 320, provide instructions for implementing respective operations of the methods described below. In some embodiments, some or all of these modules may be implemented with specialized hardware circuits that subsume part or all of the module functionality.

State indicator 322 may provide a data structure and/or indicator signal for indicating one or more states of storage device 120.1. For example, state indicator 322 may include state indicators for device power 322.1, device resources 322.2, and device peer operation 322.3.

In some embodiments, device power 322.1 indicates whether or not storage device 120.1 is connected to a power supply and in a powered on or powered off state. For example, visual indicators 340 may include a power light configured to indicate power connection, power off, and power on states using colors and/or blink patterns. In some embodiments, device power 322.1 may include other power states, such as a sleep or power-saver mode. In some embodiments, device power 322.1 may include a data structure for storing current state values and those values may be available or communicated to an external graphical user interface and/or storage management interface, such as storage management system 250 in FIG. 2.

In some embodiments, device resources 322.2 indicates whether or not storage device 120.1 is engaged in internal processing activities or standing by and available for processing. For example, visual indicators 340 may include a busy or processing light configured to indicate active use of CPU 302 and/or other compute resources. In some embodiments, device resources 322.2 may include separate or composite indicators for processor use, memory use, network/communication use, media use, etc. For example, visual indicators 340 may include a plurality of indicator lights for different categories of resource use and/or a graphical display configured to show resource use across categories, such as a processor meter, a memory meter, and a network meter. In some embodiments, device resources 322.2 may include a data structure for storing resource values for current resource usage and those values may be available or communicated to an external graphical user interface and/or storage management interface, such as storage management system 250 in FIG. 2.

In some embodiments, device peer operation 322.3 indicates whether or not storage device 120.1 is engaged in a peer operation with one or more peer storage devices. For example, visual indicators 340 may include a peer operation light configured to indicate a peer operation state using on/off or colors and/or blink patterns for indicating more than two states. In some embodiments, device peer operation 322.3 may include indicators for multiple peer operation states and/or different peer bonds, peer bond locations, etc. For example, visual indicators 340 may include a plurality of indicator lights and/or a graphical display for difference states, peer bonds, or locations.

In some embodiments, device peer operation 322.3 may be supported by peer operation state data 322.4. For example, peer operation state data 322.4 may include a data structure for storing peer operation state values for the current peer operation state of storage device 120.1. In some embodiments, peer operation state data 322.4 may be available or communicated to an external graphical user interface and/or storage management interface, such as storage management system 250 in FIG. 2. In some embodiments, peer operation state data 522.4 may also include historical data for the peer operation state, such as a data log that provides a moving window of a certain amount of time or number of state changes between peer operation states. For example, an external graphical user interface and/or storage management interface may enable an administrator to search, review, or otherwise access the historic peer operation state data for past time points, in addition to the current state.

In some embodiments, media manager 324 manages access to and maintenance of media devices 140.1. For example, media manager 324 may include base FTL services for storage device 120 and manages the storage device FTL map, as well as read, write, and data management access to media devices 140. Host commands involving host data reads, writes, erases, etc. may be directed by media manager 324 through media interface 308 for accessing media devices 140.1. In some embodiments, host data commands may be pre-processed by other modules and related internal data access commands may be received by media manager 324. In some embodiments, storage device FTL provides a base level of FTL mapping for storage device 120. Storage device FTL may include allocation of storage locations with a defined size based on compatibility of with storage units in media devices 140.1, such as page size. For example, storage locations may be allocated as 4 KB or 8 KB pages. In some embodiments, allocation sizes for storage locations may correspond to larger multiplane NVM page sizes, such as 96 KB.

Media manager 324 may be responsible for bad block management, bad block spare overprovisioning, and allocation of gap free logical space throughout the life of the media devices 140.1. In some embodiments, media manager 324 may also include error correction (e.g., low-density parity-check (LDPC) or Bose-Chaudhuri-Hocquenghem (BCH) codes) supported by an error correction engine and tuning of NVM access parameter (e.g., read levels, programming thresholds, etc.). Media manager 324 may enable reads from logical block address (LBA) storage locations in media devices 140 to write in remotely addressable memory 306 and reads from remotely addressable memory 306 to writes in LBA storage locations in media devices 140.1. In some embodiments, media manager 324 may manage data reads and writes to/from media devices 140.1 to support peer services module 332.

In some embodiments, peer communication module 326 may provide communication among storage devices 120 using interconnect fabric 114 without being routed through storage controller 110 or another host, controller, or storage control plane component. For example, peer communication module 326 may enable drive-to-drive messaging addressed by storage device identifiers, peer-drive broadcasts that provide the same message to all peer storage devices, and/or access to shared memory locations, such as remotely addressable memory 306 for direct data transfer and/or access of host and parity data, data management logs, etc. In some embodiments, packetized messages may be routed among storage devices 120.1 using one or more network communication protocols compatible with interconnect fabric 114 and/or network fabric 104.

In some embodiments, peer communication module 326 operates in conjunction with RDMA interface 304 to manage local and remote use of remotely addressable memory 306. For example, local operations by media manager 324 may include writes and reads to remotely addressable memory 306, read/write operations may include coordinated use of space in remotely addressable memory 306 for both local and remote access, and other distributed operations may use space in remotely addressable memory 306 as requested by storage controller 110 or other storage devices.

In some embodiments, peer device registry 328 may be a data structure for maintaining information regarding each other peer storage device in a peer group, such as storage devices 120 in peer group 106. For example, peer device registry 328 may be a table, list, array, database, or similar data structure for storing storage device identifiers 328.1, other addressing information, storage device status indicators 328.2, and/or additional information on peer storage devices, such as specifications and/or parameters of the storage devices. In some embodiments, storage device identifier 328.1 may include or translate into a network compatible device address for routing data frames from storage device 120.1 to a selected peer storage device.

In some embodiments, peer device registry 328 may include storage device identifiers 328.1 for each storage device corresponding to a peer group shared with storage device 120.1. For example, storage device 120.1 may belong to peer group A and each other storage device 120 in peer group A may have an entry in peer device registry 328 with a storage device identifier 328.1 for addressing peer communications. For example, each storage device may have an entry (e.g. a row in a table) with a key (e.g. storage device identifier) and a field (e.g. column in a table) for one or more peer group identifiers.

In some embodiments, peer device registry 328 may include storage device status indicators 328.2 for storing status information for each peer storage device. In some embodiments, storage device status indicators 328.2 may include state indicators for peer storage devices that include peer storage device indicators for some or all of state indicators 322, such as power indicators, resource indicators, and/or peer operation indicators. For example, peer storage devices may broadcast or respond to queries regarding their readiness to receive peer operations and the related status information may be stored as storage device status indicators 328.2. In some embodiments, storage device status indicators 328.2 may include any and all active peer bonds for peer operations in the peer group(s). In some embodiments, peer device registry 328 may be stored in storage array metadata repeated in each storage device in peer group 106.

In some embodiments, storage device 120.1 may include a peer state manager 330 for identifying, managing, and maintaining peer operation states and related peer operation state data. For example, peer state manager 330 may be responsive to peer services module 332, activate device peer operation 322.3, and/or update peer operation state data 322.4. In some embodiments, peer state manager 330 may monitor one or more processes related to peer services module 332 and/or peer communication module 326 to identify peer operations. For example, peer services module 332 and/or peer communication module 326 may register with peer state manager 330 and/or send a status message when a peer operation is initiated and/or completed.

In some embodiments, peer state manager 330 may collect metadata related to a peer operation. For example, when a current peer operation is identified, peer state manager 330 may collect a peer bond identifier 330.1, a peer bond location 330.2, a peer operation type 330.3, and/or a peer operation status 330.4. In some embodiments, peer bond identifier 330.1 may identify one or more peer storage devices by storage device identifier 328.1 that are involved in the peer operation. Peer bond location 330.2 may provide some or all of geographic, facility, rack, and/or device position information for the peer storage devices in the peer bond. For example, peer bond location 330.2 may include the peer storage device location, such as geographic and/or facility information for a remote site and/or rack and position information for locating the peer storage device within a facility. Peer bond location 330.2 may include location responsibility and/or contact information for an administrator of the peer storage device.

Peer operation type 330.3 may include a peer operation type or classification selected from a group of defined peer operation types, such as RAID storage functions, device rebuild functions, and data management functions (e.g. garbage collection, endurance management, data scrub, data offload, etc.). In some embodiments, peer operation type 330.3 may include a code corresponding to a functional operation type and/or a classification based on communication and compute resources used for the peer operation at the originating peer storage device and any other peer storage devices involved in the operation. In some embodiments, peer operation type 330.3 may also include an operation priority value that may be used by storage devices to determine which peer operations to respond to and participate in first if multiple requests are received. In some embodiments, the priority may also be used to balance allocation of resources to host commands and internal functions, in addition to peer operations.

Peer operation status 330.4 may include time-based status information for the peer operation and may change over the course of the peer operation. For example, a peer operation may be in a peer operation-initiated state, a peer operation-active state, a peer operation-suspended state, a peer operation-cancelled state, a peer operation-completed state, or a peer operation-waiting state. In some embodiments, peer operation status 330.4 may also indicate interruptible and non-interruptible states during a peer operation. For example, a peer operation may be interruptible in its initiation stage, but some operations may risk data loss if interrupted during their active state.

In some cases, a peer operation, such as participation in data mirroring, RAID rebuild, data offloading, garbage collection, data scrub, or RAID support (mirror or parity) for an extended write, may require an extended operating period of seconds, minutes, hours, or even days, depending on the scope of the task. Peer operation status 330.4 may include time-based information for the peer operation, such as an estimated time for the operation, operation time elapsed and/or time remaining. Time-based information may be expressed in time-based units, percentages of total operation time, steps within a multi-step operation, and/or other metrics for measuring and communicating progress of the peer operation. Peer operation status 330.4 may include an operation duration for the operation type and an operation duration estimate value that may be updated periodically during the peer operation.

In some embodiments, additional peer operation states may include peer operation-suspended (if operation interrupts are enabled), peer operation-cancelled, peer operation-completed, peer operation-waiting (where peer devices maintain a ready status when compute resources are available). In some embodiments, peer operation state response module 254 may provide logic for responding to each peer operation state change. For example, peer operation state response module 254 may classify some operational states as interruptible and some as non-interruptible and provide appropriate alerts to administrators 252 and/or administrators 232. In some embodiments, peer operation state response module 254 may include additional automated actions, such as visual indicators, physical locks to prevent removal of storage devices, and/or systems that prevent power cycling or other interventions that may interrupt the peer operation.

In some embodiments, storage device 120.1 may include a peer services module 332 that receives peer service requests for storage device 120.1. For example, peer services module 332 may receive a peer service request, determine the necessary and available compute resources, host data, and/or media capacity for the requested service, evaluate competing priorities, and respond to the requesting peer storage device to participate in the peer service operation(s) (or not). Peer services module 332 may be configured to handle any number of peer services requests and any given storage device and/or peer group may be configured to support one or more peer services. The following peer services are provided as explanatory examples of some of the types of peer services that may be supported by storage device 120.1, peer state manager 330, and state indicator 322.

In some embodiments, RAID module 332.1 may support distributed RAID management and writes across peer storage devices in a peer group. For example, RAID module 332.1 may process peer service requests related to data mirroring, parity calculation, allocation and management of RAID striping information, and/or other operations that may use compute, host data, and/or media capacity on storage device 120.1 to support a RAID group distributed across peer storage devices.

In some embodiments, rebuild module 332.2 may support distributed rebuild of failed storage devices, failed media devices within storage devices, unrecovered errors, and/or other data unit recovery across peer storage devices within a peer group. For example, a storage device that has identified unreadable data due to a storage device, media device, or data unit failure (e.g. from a failed read or write operation, data scrub, RAID recovery, etc.) may use mirrored, parity, or other data available from peer storage devices to rebuild the failed or failing data units to new storage locations (on the originating storage device, recovery storage device(s), or different storage devices in the peer group).

In some embodiments, data management module 332.3 may support host offloaded data management functions distributed across peer storage devices within a peer group. For example, peer storage devices may participate in distributed host LBA and/or host FTL management, garbage collection, RAID management, data scrub management, etc. In some embodiments, peer storage devices may be designated as peer group leads or initiators for offloaded host functions and/or may be responsive to host commands to initiate a peer data management function involving one or more other peer storage devices.

Figure 4:
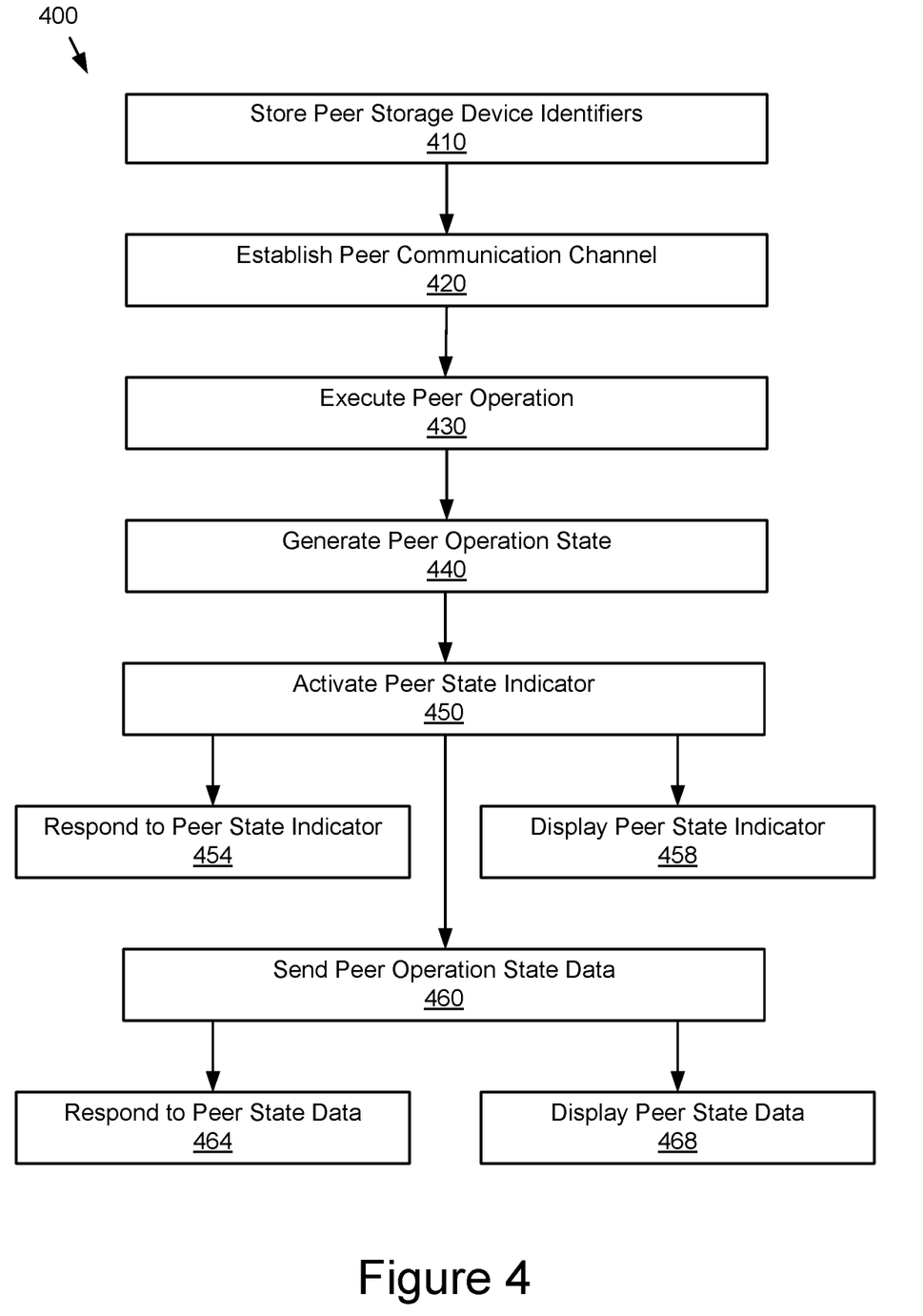
FIG. 4 illustrates an example of a method for using peer operation state indicators for a storage device.

As shown in FIG. 4, storage device 120.1 operating within data storage system 100 may be operated according to peer operations among peer data storage devices 120 that provide peer operation state information. For example, storage device 120.1 may initiate peer operations with one or more peer storage devices (e.g. storage devices 120) and provide peer operation state information according to the method 400 illustrated by blocks 410-468 of FIG. 4.

At block 410, peer storage device indicators are stored for at least one peer group. For example, a storage device may include a peer storage device registry that contains peer storage device indicators for at least every other storage device in that storage device's peer group or peer groups. The peer storage device indicators may enable peer-to-peer communications to be addressed and routed between the peer storage devices.

At block 420, at least one peer communication channel between an initiating storage device and a peer storage device is established. For example, the peer storage devices in a peer group may be connected by a common interconnect fabric and/or network fabric that enables each peer storage device to address and send data frames (messages and/or data transfer) to each other peer storage device. In some embodiments, a peer communication channel for packetized messages over network protocols may be established among the peer group upon startup and/or configuration of the peer storage devices and/or peer group and a second peer communication channel for data transfer (such as between remotely addressable memories) may be established as needed for specific peer operations. In some embodiments, a peer communication channel may be established via a network handshake process where the two (or more) peer storage devices agree that they are available for and initiating a peer operation.

At block 430, a peer operation is executed by two or more peer storage devices. For example, in response to a peer service request from an initiating storage device, a peer storage device may agree to initiate the peer service involving one or more peer operations over the peer communication channel between them. The two or more peer storage devices may be referred to as having a peer bond or being peer bonded during the peer operation. In some embodiments, the peer service may include more than one peer operation, such as a peer data query operation followed by a peer data transfer operation. A peer operation may have more than one step, such as establishing remote memory access, transferring a series of data blocks using the remote memory access, writing the data blocks from remotely accessible memory to media device storage, and updating LBA information.

At block 440, a peer operation state may be generated. In some embodiments, the peer operation state may be limited to the existence of a peer bond for a current peer operation and the peer operation state may be reflected by a binary value (peer operation or no peer operation). In some embodiments, peer operation state may include more than two states that correlate to one or more steps in a peer service and/or peer operation.

At block 450, a peer state indicator may be activated in response to generation of the peer operation state. For example, when the peer operation is identified and the peer operation state is generated, a signal, message, or change in value may activate a peer state indicator, such as a visual indicator on the housing of a storage device, a graphical user interface for a storage management system, or state variable change that triggers an automated response. In some embodiments, the peer state indicator is displayed to a user, such as a storage system administrator, at block 458. In some embodiments, an automatic response, such as an alert message and/or storage device or power supply lock, is generated from the peer state indicator at block 454.

At block 460, more detailed peer operation state data may be sent to a system or user in response to the peer state indicator. For example, when a peer operation state is active, a user may desire additional information regarding the peer bond, peer operation type, and peer operation status. In some embodiments, some or all of this additional information may be collected or identified in response to the peer operation state and sent to a data location and data structure to support further actions or sent to visual indicator capable of displaying or visualizing the data. In some embodiments, one or more systems may respond to the peer operation state data at block 464. For example, the data may be parsed by a storage management system to generate an automated response. In some embodiments, one or more visual indicators may display or visualize the data at block 468, enabling a user to use and respond to the data.

Figure 5:
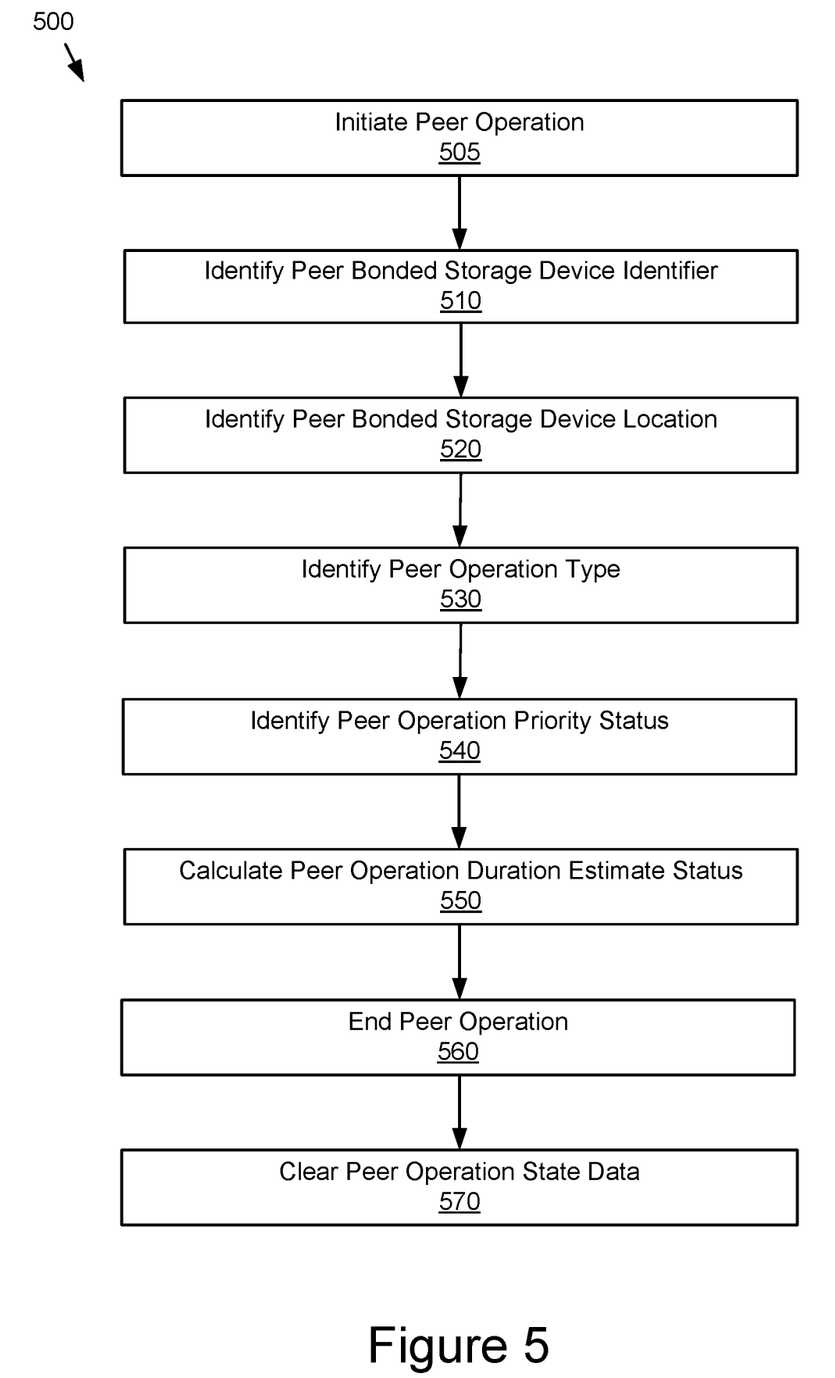
FIG. 5 illustrates an example of a method for generating peer operation state data using a storage device.

As shown in FIG. 5, storage device 120.1 operating within data storage system 100 may be operated according to peer operations among peer data storage devices 120 that provide peer operation state data. For example, storage device 120.1 may initiate peer operations with one or more peer storage devices (e.g. storage devices 120) and provide peer operation state data according to the method 500 illustrated by blocks 505-570 of FIG. 5.

At block 505, a peer operation is initiated. The peer operation may involve a peer bond between at least two storage devices to establish communication of data over a peer communication channel that bypasses the storage control plane of the storage devices. The peer operation may include a combination of peer communication between the peer bonded storage devices, data read/write operations to/from the media devices of one or more peer bonded storage devices, data transfer between the peer bonded storage devices, and/or using the compute resources of one or more peer bonded storage devices.

At block 510, each storage device in the peer bond may identify the storage device identifier of each other storage device in the peer bond. For example, if a first storage device initiated a peer operation with a second storage device, the first storage device may identify the storage device identifier of the second storage device and the second storage device may identify the storage device identifier of the first storage device. The identified storage device identifier(s) may be stored in a data structure, variable, or state information corresponding to peer operation state data for the peer operation.

At block 520, each storage device in the peer bond may identify the storage device location of each other storage device in the peer bond. For example, once the storage device identifier of the peer storage device is identified, the location (e.g. country, city, facility, room, rack, position, etc.) may be identified from a peer device registry containing such information for each other storage device in the peer group, through a query to the peer storage device or another system, or through parameters included in the peer operation initiation. The identified storage device location(s) may be stored in a data structure, variable, or state information corresponding to peer operation state data for the peer operation.

At block 530, a peer operation type may be identified for the current peer operation. For example, different peer services or peer operations may correlate to peer operation types. A value or code for the peer operation type may be provided by a module initiating the peer operation, included as a state variable, message parameter, or metadata associated with the peer operation, or looked up in a peer operation type table based on one or more parameters. The identified peer operation type may be stored in a data structure, variable, or state information corresponding to peer operation state data for the peer operation.

At block 540, a peer operation priority status may be identified for the current peer operation. For example, different peer services or peer operations may correlate to operation priority status and be used for determining how storage device resources should be allocated. In some embodiments, the peer operation priority status may be assigned based on the peer operation type or the peer operation type in combination with one or more other parameters related to the peer operation and/or peer bonded storage devices. The identified peer operation priority status may be stored in a data structure, variable, or state information corresponding to peer operation state data for the peer operation.

At block 550, a peer operation duration estimate status may be calculated. For example, the peer operation type and/or other peer operation parameters may be used to estimate the operation duration of the peer operation. The operation duration may be calculated by looking up a duration based on the operation type and one or more other parameters, such as number of data blocks, communication lag between peer storage devices, etc. In some embodiments, the estimated peer operation duration may be provided as a peer operation status variable and/or combined with progress information to provide elapsed and/or remaining operation status based on time, percent complete, operation steps, etc. The identified peer operation duration estimate status may be stored in a data structure, variable, or state information corresponding to peer operation state data for the peer operation.

At block 560, the peer operation may end. For example, the operation may complete (or be cancelled), ending the peer bond and changing the peer operation state to no peer operation.

At block 570, the peer operation state data for the recently concluded peer operation may be cleared. For example, a data structure, memory log, or session/state information may be cleared from memory. In some embodiments, the peer operation state data may be written to a historic log prior to clearing from the location for current state information.

While at least one exemplary embodiment has been presented in the foregoing detailed description of the technology, it should be appreciated that a vast number of variations may exist. It should also be appreciated that an exemplary embodiment or exemplary embodiments are examples, and are not intended to limit the scope, applicability, or configuration of the technology in any way. Rather, the foregoing detailed description will provide those skilled in the art with a convenient road map for implementing an exemplary embodiment of the technology, it being understood that various modifications may be made in a function and/or arrangement of elements described in an exemplary embodiment without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware embodiment, an entirely software embodiment (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g. through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A storage device, comprising:
    a processor;
    a memory;
    an interface configured to communicate with a plurality of peer storage devices configured for peer-to-peer data operations through an interconnect fabric; and
    a peer state manager stored in the memory and executable by the processor to perform operations comprising:
        identifying a peer operation that communicates data through the interface to at least one peer storage device of the plurality of peer storage devices, wherein the data communicated by the peer operation bypasses a storage controller configured to provide data management commands to the storage device;
        generating a peer operation state during an operating period of the peer operation; and
        activating a state indicator configured to indicate the peer operation state generated by the peer state manager.

2. The storage device of claim 1, wherein the operations further comprise:
    identifying a peer storage device identifier for the peer operation; and
    generating peer operation state data including the peer storage device identifier.

3. The storage device of claim 2, wherein the operations further comprise:
    identifying a peer storage device location corresponding to the peer storage device identifier; and
    including the peer storage device location in the peer operation state data.

4. The storage device of claim 2, wherein the operations further comprise:
    identifying a peer operation type corresponding to the peer operation, the peer operation type selected from a plurality of peer operation types; and
    including the peer operation type in the peer operation state data.

5. The storage device of claim 2, wherein the operations further comprise:
    identifying a peer operation status corresponding to the peer operation, the peer operation status including at least an operation priority; and
    including the peer operation status in the peer operation state data.

6. The storage device of claim 5, wherein the peer operation status includes at least one operation duration estimate value.

7. The storage device of claim 2, wherein the state indicator includes a graphical user interface configured to display the peer operation state data.

8. The storage device of claim 1, further comprising a storage device housing, wherein the state indicator includes at least one visual indicator on an exterior of the storage device housing, the at least one visual indicator distinguishable from a device power indicator and a device processing indicator.

9. The storage device of claim 1, wherein:
    the state indicator is in communication with the storage controller;
    the storage controller provides at least one automated response to a peer operation state change received from the state indicator; and
    the peer operation state change is from a first peer operation state value to a second peer operation state value.

10. A computer-implemented method, comprising:
    storing, in a first storage device, storage device identifiers for a plurality of peer storage devices configured for peer-to-peer data operations through an interconnect fabric;
    establishing a peer communication channel with at least one peer storage device of the plurality of peer storage devices from the first storage device, wherein data communicated through the peer communication channel bypasses a storage controller configured to provide data management commands to the first storage device;
    executing a peer operation that communicates data through the peer communication channel;
    generating a peer operation state during an operating period of the peer operation; and
    activating a state indicator in response to the peer operation state during the operating period.

11. The computer-implemented method of claim 10, further comprising:
    identifying a peer storage device identifier for the peer operation;

generating peer operation state data including the peer storage device identifier; and sending, using the state indicator, the peer operation state data.

12. The computer-implemented method of claim 11, further comprising:

identifying a peer storage device location corresponding to the peer storage device identifier; and including the peer storage device location in the peer operation state data.

13. The computer-implemented method of claim 11, further comprising:

identifying a peer operation type corresponding to the peer operation, the peer operation type selected from a plurality of peer operation types; and including the peer operation type in the peer operation state data.

14. The computer-implemented method of claim 11, further comprising:

identifying a peer operation status corresponding to the peer operation, the peer operation status including at least an operation priority; and including the peer operation status in the peer operation state data.

15. The computer-implemented method of claim 14, wherein the peer operation status includes at least one operation duration estimate value.

16. The computer-implemented method of claim 11, further comprising:

displaying, through a graphical user interface, the state indicator and at least one peer operation state value from the peer operation state data.

17. The computer-implemented method of claim 10, further comprising:

providing a storage device housing for the first storage device, wherein the state indicator includes at least one visual indicator on an exterior of the storage device housing, the at least one visual indicator distinguishable from a device power indicator and a device processing indicator.

18. The computer-implemented method of claim 10, further comprising:

receiving the state indicator at the storage controller; and providing at least one automated response to a peer operation state change received in response to the state indicator, wherein the peer operation state change is from a first peer operation state value to a second peer operation state value.

19. A storage system, comprising:

a plurality of peer storage devices, wherein each of the plurality of peer storage devices comprises:

means for storing storage device identifiers for a plurality of peer storage devices configured for peer-to-peer data operations through an interconnect fabric;

means for establishing a peer communication channel between at least two peer storage devices of the plurality of peer storage devices, wherein data communicated through the peer communication channel bypasses a storage controller configured to provide data management commands to the at least two peer storage devices of the plurality of peer storage devices;

means for executing a peer operation that communicates data through the peer communication channel;

means for generating a peer operation state during an operating period of the peer operation; and means for activating a state indicator in response to the peer operation state during the operating period.

20. The storage system of claim 19, further comprising:

means for generating peer operation state data corresponding to the peer operation state; and means for displaying the state indicator and at least one peer operation state value from the peer operation state data.

* * * * *